United States Patent [19]

Hamilton et al.

[11] 3,927,817
[45] Dec. 23, 1975

[54] METHOD FOR MAKING METALLIC SANDWICH STRUCTURES

[75] Inventors: C. Howard Hamilton, San Pedro; Leonard A. Ascani, Jr., Palos Verdes Estates, both of Calif.

[73] Assignee: Rockwell International Corporation, El Segundo, Calif.

[22] Filed: Mar. 20, 1975

[21] Appl. No.: 560,437

Related U.S. Application Data

[63] Continuation-in-part of Ser. No. 511,900, Oct. 3, 1974.

[52] U.S. Cl. .............................................. 228/157
[51] Int. Cl.² .......................................... B23K 31/02
[58] Field of Search ........... 228/157, 118, 173, 181, 228/193, 195, 199, 233, 234; 72/60, 364; 148/11.5 R

[56] References Cited
UNITED STATES PATENTS

| | | | |
|---|---|---|---|
| 3,340,101 | 9/1967 | Fields et al., | 148/11.5 R |
| 3,466,726 | 9/1969 | Savolainen | 228/157 X |
| 3,595,060 | 7/1971 | Hundy | 148/11.5 R X |

*Primary Examiner*—James L. Jones, Jr.
*Assistant Examiner*—Margaret Joyce
*Attorney, Agent, or Firm*—Charles T. Silberberg

[57] ABSTRACT

A method for fabrication of metallic sandwich structures in which metal blanks, preferably of a titanium alloy, are joined at selected areas and expanded superplastically to form a desired sandwich structure. Various techniques are joining, preferably diffusion bonding, selected areas of the metal blanks are disclosed. These include treating the metal blanks at selected areas to prevent bonding at those areas and selective application of pressure during bonding. In the preferred embodiment, the metal blanks are positioned in a stack after being treated at selected areas. The stack is positioned relative to shaping members and heated to a temperature suitable for superplastic forming and diffusion bonding. Compressive pressure is applied for the selective diffusion bonding. The stack is expanded into contact with the shaping members by increasing the internal pressure therein, preferably with inert gas, thus forming the desired shaped sandwich structure in one operation.

38 Claims, 13 Drawing Figures

METHOD FOR MAKING METALLIC SANDWICH STRUCTURES

This application is a continuation-in-part of our co-pending application Ser. No. 511,900, filed Oct. 3, 1974.

BACKGROUND OF THE INVENTION

For many years it has been known that certain metals, such as titanium and many of its alloys, exhibit superplasticity. Superplasticity is the capability of a material to develop unusually high tensile elongations with reduced tendency toward necking. This capability is exhibited by only a few metals and alloys and within a limited temperature and strain rate range. Titanium and titanium alloys have been observed to exhibit superplastic characteristics equal to or greater than those of any other metals. With suitable titanium alloys, overall increase in surface areas up to 300% are possible.

The advantages of superplastic forming are numerous: very complex shapes and deep drawn parts can be readily formed; low deformation stresses are required to form the metal at the superplastic temperature range, thereby permitting forming of parts under low pressures which minimize tool deformation and wear, allows the use of inexpensive tooling materials, and eliminates creep in the tool; single male or female tools can be used; no spring-back occurs; no Bauschinger effect develops; multiple parts of different geometry can be made during a single operation; very small radii can be formed, and no problem with compression buckles or galling are encountered. However, when superplastic forming of titanium and similar reactive metals, it is necessary to heat and form in a controlled environment to ensure cleanliness of the titanium which is particularly sensitive to oxygen, nitrogen, and water vapor content in the air at elevated temperatures. Unless the titanium is protected, it becomes embrittled and its integrity destroyed.

Diffusion bonding refers to the metallurgical joining of surfaces of similar or dissimilar metals by applying heat and pressure for a time duration so as to cause co-mingling of atoms at the joint interface. Diffusion bonding is accomplished entirely in the solid-state at or above one-half the base metal melting point (absolute). Actual times, temperatures, and pressures will vary from metal to metal. The joining surfaces must be brought within atomic distances by application of pressure. Adequate pressure must also be provided to cause some plastic flow to fill normal void areas. If pressures are too low, small voids will remain at the joint interface and the joint strength will be less than the maximum obtainable. The application of pressure also breaks up the surface oxides and surface asperities so as to present clean surfaces for bonding. The elevated temperatures used for diffusion bonding serve the functions of accelerating diffusion of atoms at the joint interfaces and providing a metal softening which aids in surface deformation so as to allow more intimate contact for atom bonding and movement across the joint interface. The elevated temperature and application of pressure also results in diffusion of the surface contaminants into the base metal during bonding which allows metal atom-to-atom bonding and thereby strengthens the bond. Sufficient time must be allowed to ensure the strengthening of the bond by diffusion of atoms across the joint interface. A protective atmosphere for bonding is required when titanium and other similar reactive metals are to be bonded.

The process of superplastic forming of metals and diffusion bonding have individually been disclosed in the prior part. U.S. Pat. No. 3,340,101 to Fields, Jr., et al. discloses a method of superplastic forming where a metal is conditioned to exhibit its effective strain rate sensitivity and then formed by application of vacuum solely or in combination with a metal dye. Patents relating to solid-state or diffusion bonding include U.S. Pat. Nos. 3,145,466; 3,180,022; 3,044,160; 2,850,798; and 3,170,234. However, the prior art does not disclose combining these two processes.

In my aforementioned co-pending application there is disclosed a method for superplastic forming of metals with concurrent diffusion bonding. The crux of that invention is the superplastic forming of a metal blank against a shaping member and another metal workpiece so that the metal blank is formed and diffusion bonded to the other metal workpiece in one operation. Though a hollow metal structure bonded at peripheral edges can be formed as disclosed in that application, the process is not designed for the forming of sandwich structures. The forming of sandwich structures according to the present invention requires separate superplastic forming and joining stages and a technique for joining only selective areas of the metal blanks employed.

The present invention obviates the prior art problems of forming sandwich structures. A sandwich structure normally comprises a core between face sheets. Previous to Applicants' invention, fabrication of sandwich structures typically took the approach of first rolling metal foil or ribbon, forming and joining the foil sheet into the desired cellular core, and then attaching the core to face sheets by brazing or spot welding. Problems with the prior art method include the cost of the core due to excess material usage and the great difficulty, excess time consumption, and cost of fabrication of the sandwich shape. Additionally, a separate operation is required to join a close out or attachment to the sandwich structure. Fabrication of an unusual shape for the sandwich structure such as a taper, is nearly impossible.

SUMMARY OF THE INVENTION

It is, therefore, an object of the present invention to combine the processes of metal joining and superplastic forming to form metal sandwich structures.

Is is another object of the present invention to form metal sandwich structures in one operation, thereby significantly lowering the cost, difficulty, and time involved.

It is yet another object of the present invention to form a sandwich structure and join an attachment or close-out in the same operation.

It is still another object of the present invention to heat, superplastically form, and join the sandwich in the same apparatus, thereby saving fabrication time and equipment costs.

Briefly, in accordance with the invention, there is provided a method for making a metallic sandwich structure from a plurality of metal blank workpieces initially positioned in a stacked position. The blanks are joined at selected areas. At least one of the blanks is superplastically formed against a shaping member to form the desired sandwich structure. The core configuration is determined by the location, size, and shape of the joined areas.

Other objects and advantages of the invention will become apparent upon reading the following detailed description and upon reference to the drawings.

While the invention will be described in connection with the preferred procedures, it will be understood that it is not intended to limit the invention to those procedures. On the contrary, it is intended to cover all alternatives, modifications, and equivalents that may be included within the spirit and scope of the invention as defined by the appended claims.

DETAILED DESCRIPTION OF THE INVENTION

In order for superplastic forming to be successful, it is necessary to use a material that is suitable. The extent to which the material selected will exhibit superplastic properties is predictable in general terms from a determination of the strain rate sensitivity and a design determination of the permissible variation in wall thickness. Strain rate sensitivity can be defined as $m$ where $m$ equals $d\ln\sigma/d\ln\epsilon$ and $\sigma$ is stress in pounds per square inch and $\epsilon$ is strain rate in reciprocal minutes. Strain rate sensitivity may be determined by a simple and now well recognized torsion test described in the article, "Determination of Strain Hardening Characteristics by Torsion Testing," by D. S. Fields, Jr., and W. A. Backofen, published in the Proceedings of the A.S.T.M., 1957, Volume 57, pages 1259–1272. A strain rate sensitivity of about 0.5 or greater can be expected to produce satisfactory results. The larger the value (to a maximum of one) the greater the superplastic properties. Maximum strain rate sensitivity in metals is seen to occur, if at all, as metals are deformed near the phase transformation temperature. Accordingly, the temperature immediately below the phase transformation temperature can be expected to produce the greatest strain rate sensitivity. For titanium alloys, the temperature range in which superplasticity can be observed is about 1450°F. to about 1850°F. depending on the specific alloy used.

Other variables have been found to effect strain rate sensitivity and therefore should be considered in selecting a suitable metal material. Decreasing grain size results in correspondingly higher values for strain rate sensitivity. Additionally strain rate and material texture effect the strain rate sensitivity. It has been found that for titanium the $m$ value reaches a peak at an intermediate value of strain rate (approximately $10^{-4}$ in./in./sec.). For maximum stable deformation, superplastic forming should be done at or near this strain rate. Too great a variance from the optimum strain rate may result in loss of superplastic properties.

Diffusion bonding, where separate elements form a single unitary mass therefrom, may be practiced in a wide variety of metals and alloys. However, the quality of the bond and the parameters employed will necessarily vary for each particular choice of workpiece material. Among the metals or alloys which may be joined by solid state diffusion bonding are aluminum, stainless steel, titanium, nickel, tantalum, molybdenum, zirconium, columbium, and beryllium.

The present invention is particularly directed to the reactive metals whose surfaces would be contaminated at the elevated temperatures required for superplastic forming and diffusion bonding. Titanium and its alloys are examples of such metals which have also been found to be particularly well suited for a process of the present invention in that these alloys exhibit very high superplastic properties in a temperature range suitable for diffusion bonding, i.e., 1450°F. to about 1850°F. depending on the specific alloy used.

Figure 1:
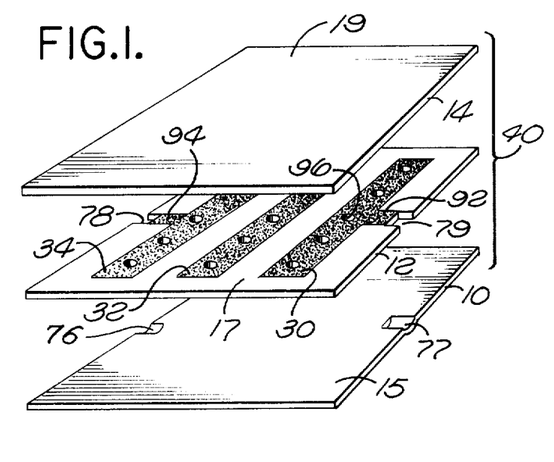
FIG. 1 is an exploded view of a three-piece metal sheet assembly treated for selective diffusion bonding prior to insertion in the forming apparatus.

Turning first to FIG. 1, there is shown an exploded view of a three-piece metal sheet assembly to be formed into a sandwich structure according to the present invention. The assembly is made up of metal blanks 10, 12, and 14, all preferably in the form of sheets having upper and lower opposed principal surfaces 15 and 16, 17 and 18, and 19 and 20, respectively (see also FIG. 4). The number of sheets used will vary depending on load conditions and design requirements. However, a minimum of two sheets must be utilized and normally no more than four sheets would be used. The metal sheets must have the ability to be joined by such methods as brazing, welding, or diffusion bonding. Depending on the number of sheets to be expanded, at least one of the sheets must exhibit superplastic properties. Any metal that exhibits suitable superplastic properties within a workable temperature range can be used for such sheet, but the present invention is particularly concerned with metals that exhibit superplastic properties within the temperature range required for diffusion bonding and that are subject to contamination at forming temperature, as titanium or an alloy thereof such as Ti-6Al-4V. When using Ti-6Al-4V; the forming temperature is preferably approximately 1700°F. Initial thickness of metal blanks 10, 12, and 14 are determined by the dimensions of the part to be formed.

In order to join only selected areas of the metal sheets, a preferred step is to apply a suitable stop-off material to those areas within the stack where no attachment or joining between the sheets is desired. Thus, areas 30, 32, and 34 are covered with a stop-off material to prevent bonding in those areas. Other areas on surfaces 15, 18, and 20 could also be so covered for prevention of joining. Alternatively, the metal sheet structure could be spot welded or brazed at those areas where joining is desired. Additionally, as hereinafter explained, the metal sheet structure or stack 40 could be diffusion bonded at selected areas by selective application of pressure.

Figure 2:
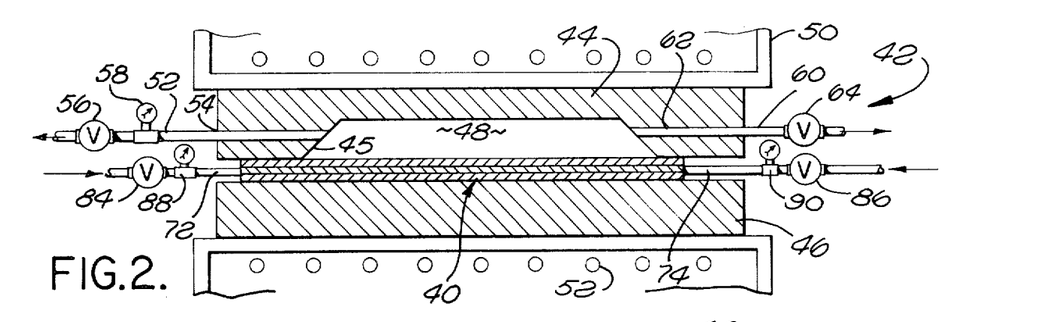
FIG. 2 is a cross-sectional elevational view of a preferred embodiment of a forming apparatus used for fabrication of metal sandwich structures with the three piece metal sheet assembly of FIG. 1 inserted therein.
Figure 3:
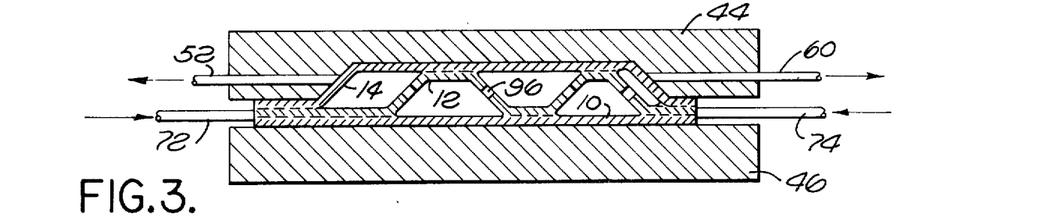
FIG. 3 illustrates the fully expanded three-piece metal sheet assembly within the forming apparatus of FIG. 2 with broken lines added to delineate the final position of the component metal sheets of the expanded joined assembly.

FIG. 2 illustrates a preferred forming apparatus generally indicated at 42 for carrying out the invention. Upper tooling frame 44 has preferably integral side walls 45 in the form of a ring which can be of any desired shape. Lower tooling frame 46 which preferably has the same outer area dimensions as upper frame 42 can be flat and act as a base as illustrated for supporting the stack of metal blanks 40. For purposes of the claims, both upper tooling frame 44 and lower tooling frame 46 are to be considered shaping members as both combine to form the desired shaped structure. The inner surface of upper tooling frame 44 defines an inner chamber 48 and a female die surface. One or more male die members (not shown) can be provided in chamber 48 to vary the shape of the part to be formed. The stack of metal blanks 40, which is supported on lower tooling frame 46, covers chamber 48. The metal blanks of the stack must all be of a material suitable for joining such as by welding, brazing, or diffusion bonding. At least one of the outer metal blanks, and most likely the inner blanks, must have an effective strain rate sensitivity for exhibiting superplastic properties at a desired forming temperature and preferably within a temperature range required for diffusion bonding of the stack. This is shown in FIG. 3 by the expanded stack 40 where both sheets 12 and 14 have been superplastically expanded, while sheet 10 of the formed stack has been substantially unchanged. Initial thicknesses of the sheets of stack 40 are determined by the dimensions of the parts to be formed. The joining method to be used, namely welding, brazing, or diffusion bonding, depends on the material selected for the metal blanks, the temperature required for superplastic forming, and the desired strength. However, especially for titanium, diffusion bonding is preferred as this results in the strongest joining and the bonding temperature is generally suitable for superplastic forming.

As previously mentioned, stop-off can be used at areas 30, 32, and 34 to prevent bonding at those areas. The particular stop-off selected must prevent bonding and be compatible with the metal or metals of the stack (nonreactive with the stack metals and minimal diffusion into the stack metals). For titanium metal blanks, suitable stop-off materials are graphite, boron nitride, and yttria. Typically, when using yttria stop-off, the stop-off pattern on the blanks is sprayed with a solution of yttria and a binder therefor. The binder holds the yttria in position during bonding and eventually vaporizes below forming temperature.

Joining the stack 40 at selected locations, when by brazing or spot welding is normally accomplished outside of the forming apparatus 42 before the stack is placed therein. When diffusion bonding, the unjoined stack 40 is preferably bonded after placement in the forming apparatus 42, thereby saving fabrication time and equipment costs (although the stack could be diffusion bonded as by press bonding or roll bonding before placing it in the forming apparatus 42). The weight of upper tooling frame 44 acts as a clamping means for the stack 40. A single continuous edge of the stack 40 is effectively constrained between the upper tooling frame 44 and the lower tooling frame 46. This insures that those portions of the blanks of the stack to be formed, will be stretched rather than drawn. Should it be desired, additional tightening means such as bolts (not shown) can be employed to more effectively constrain the stack 40. Another additional tightening means that could be employed is a press (not shown), preferably hydraulic, having platens 50. Forming apparatus 42 is positioned between platens 50 and compressed thereby assuring that stack 40 is effectively constrained and chamber 48 sealed from the air. This arrangement is particularly advantageous as the platens 50 can be made of ceramic material and resistance heated wires 52 can be provided therein for heating stack 40 to the forming temperature. Other heating methods could be used with the forming apparatus 42 ordinarily surrounded by a heating means if the heating platens are not used.

For contamination prevention and diffusion bonding of the stack 40 when unjoined within the forming apparatus 42, an environmental control system is provided. The purpose of the system is to expose the stack 40 only to inert gas or vacuum while heating, forming, and bonding, and optionally, to diffusion bond the stack by fluid pressure. The metal blanks of stack 40 will not react with inert gas due to the nature of inert gas, even at the elevated forming and bonding temperatures. In a high vacuum, there are substantially no elements for the stack 40 to react with. Thus, in this environment, contamination of the stack 40 will be prevented.

Line 52 is connected to a source of pressurized inert gas at one end (not shown) and to chamber 48 through orifice 54 in upper tooling frame 44. A valve 56 for governing the flow of inert gas through line 52 into chamber 48 and a pressure gauge 58 to indicate pressure are provided. The inert gas used is preferably argon in liquid form. Line 52 also functions as an outlet for inert gas in chamber 48 and could also be connected to a source of vacuum, such as a suction pump (not shown) for creating vacuum in chamber 48. When line 52 is used as an outlet, valve 56 governs flow of inert gas from chamber 48. An additional line 60 is optimally provided on the opposite side of tooling frame 44 and functions as an outlet for inert gas in chamber 48. Line 60 is connected to chamber 48 through orifice 62 in upper tooling frame 44. Line 60 has a valve 64 provided therein for regulation of inert gas flow from chamber 48. Line 60 can simply function as a vent or be connected to a source of vacuum, such as a suction pump (not shown).

As previously stated, the contamination prevention system can also function as a means for gas pressure diffusion bonding stack 40. Thus, when stack 40 is placed in forming apparatus 42 as illustrated in FIG. 2, the stack can be heated in an inert gas atmosphere to a suitable diffusion bonding temperature (approximately 1700°F. when the metal blanks of stack 40 are of Ti-6Al-4V) by heat generated from heating platens 50, and then applying pressure to stack 40 by increasing the pressure in chamber 48 by adding additional pressurized inert gas through line 52 while maintaining line 60 closed by valve 64. In this manner, the untreated areas of stack 40 will be diffusion bonded by the application of such pressure, which is preferably approximately 500 psi for Ti-6A1-4V, for a suitable forming time, which depends on the thickness of stack 40 and may vary from 30 minutes to 12 hours. The edges of the blanks of stack 40 may also be diffusion bonded if desired by virtue of sealing pressure thereon in the form of the weight of upper tooling 44 and optionally pressure from a press and/or a clamping means. After diffusion bonding stack 40, excess inert gas would be removed from chamber 48 through lines 52 and 60 to allow for inflation of stack 40.

Figure 4:
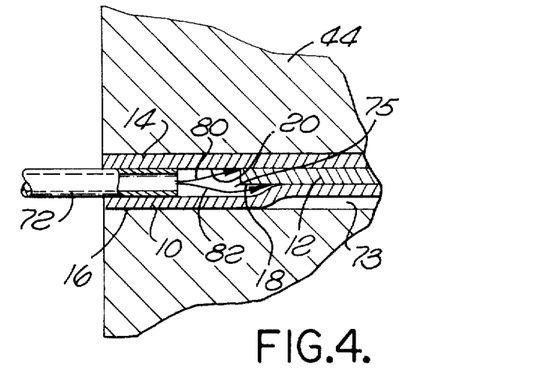
FIG. 4 is a detail view of an inflation tube connection to the three-sheet assembly.

For expansion of stack 40 to the configuration shown in FIG. 3 expansion tubes 72 and 74 are provided, the details of which are best illustrated in FIGS. 1 and 4. Expansion tube 72 (and likewise expansion tube 74 located on the opposite side of stack 40) is positioned between metal blanks 10 and 14 and protrudes into a channel 75 defined by recesses 76 and 78 and that portion of surface 20 of metal blank 14 which overlies recess 78. Recesses 77 and 79 are provided on the opposite sides of blanks 10 and 12 respectively to provide a channel for inflation tube 74. The positioning of expansion tube 72 in such a channel 75 prevents compression of tube 72 by the tooling frames 44 and 46. Also, by locating tube 72 so that it protrudes only partially into channel 75, inert gas will flow fairly evenly between the metal blanks of stack 40, in this case on either side of blank 12 as shown by arrows 80 and 82. As shown in FIG. 2 expansion tubes 72 and 74 have valves 84 and 86 therein respectively for governing flow of inert gas therethrough, and pressure gauges 88 and 90 for indicating pressure.

Expansion tubes 72 and 74 can also serve to draw off vaporized binder. To this end, tube 72 could act as an inlet and tube 72 an outlet with inert gas flow being transmitted through stack 40 prior to expansion of stack 40 to draw off the vaporized binder.

A pair of lateral grooves 71 (not shown) and 73 are preferably provided on opposite sides of lower tooling frame 46 with groove 71 in alignment with recess 77 and groove 73 in alignment with recess 76. The grooves 71 and 73 are provided to insure that passage of inert gas from inflation tubes 72 and 74 between the metal blanks of stack 40 is not prevented from reaching treated areas 30 and 34 by pinching of the stack due to the pressure exerted by upper and lower tooling frames 44 and 46. The width of grooves 71 and 73 are preferably the same as recesses 76 and 77, but grooves 71 and 73 terminate further inward in stack 40 so that pinching does not occur before the inert gas flow reaches treated areas 30 and 34.

As shown in FIG. 1 when treating as by stop-off selected areas of stack 40 to prevent diffusion bonding thereon, additional areas such as that shown at 92 and 94 should likewise be treated to prevent bonding thereon so that the gas from inflation tubes 72 and 74 will reach the selected treated areas for expansion of stack 40. Apertures 96 are provided in treated areas 30, 32 and 34 for further transmitting the inert gas from inflation tubes 72 and 74 inside stack 40 to the other treated areas and to insure equal pressure inside stack 40 (in this case on either side of metal blank 12). If pressure is unequal, the resulting core of the sandwich, metal blank 12 in the configuration illustrated in FIG. 3, would be distorted with a consequent effect on load carrying ability on the final sandwich structure.

In order to make the expanded metallic sandwich structure as shown in FIG. 3 according to Applicants' inventive method, metal blank workpieces 10, 12 and 14 are provided. Both sheets 12 and 14 must be of a material having an effective strain rate sensitivity for superplastic forming. Optimally one or more of the blanks are treated at specified locations such as 30, 32, and 34 so that when the metal blanks are arranged in a stack 40 and diffusion bonded, only selected areas of the stack will be joined thereby. Alternately, the stack 40 could be spot welded or brazed for selective joining. When joining by diffusion bonding, the stack 40 would optimally be placed in the forming apparatus 42 before forming. The pressure in chamber 48 would be increased by flow of pressurized inert gas through line 52 into chamber 48. Once chamber 48 had an inert gas atmosphere, the stack 40 would be heated by resistance wires 52 in heating platens 50 to a temperature which optimally would be suitable for both diffusion bonding and superplastic forming, although the temperature could later be raised or lowered if a different temperature is required for superplastic forming. The pressure in chamber 48 would be increased by additional pressurized inert gas through line 52 to a pressure suitable for diffusion bonding of stack 40. That pressure would be maintained for a time duration sufficient for diffusion bonding. When the metal blanks of stack 40 are of Ti-4V-6A1 alloy, the temperature used would be approximately 1700°F. and the pressure about 500 psi. These values can of course be varied during forming and bonding as long as they are maintained within a suitable range, i.e. in which the values would be sufficient for diffusion bonding and/or superlastic forming. The time duration will vary depending upon the alloys used, temperature, pressure, and thickness of stack 40. Duration may vary from 30 minutes to 15 hours, but three hours is a fairly representative expectation. As previously stated, bonding temperature may vary from 1450°F to about 1850°F. Bonding pressure may vary from about 100 psi to 2000 psi or more with the preferred range being 150 psi to 600 psi.

Before expanding stack 40, the pressure in chamber 48 is reduced through lines 52 and 60. When stack 40 is joined prior to insertion in forming apparatus 42, the preceding diffusion bonding step in forming apparatus 42 would be omitted. At superplastic forming temperature, which is approximately 1700°F for Ti-4V-6A1 alloy (generally 1650°–1750°F), stack 40 is expanded by flowing pressurized insert gas through lines 72 and 74 while optimally a vacuum is applied to chamber 48 through lines 52 and 60. The pressurized inert gas, which protects the interior of stack 40 from contamination at the elevated forming temperatures, flows from tubes 72 and 74 into channels 75, preferably on opposite sides of stack 40, whereupon the inert gas flows within stack 40. Such pressurized inert gas within stack 40 forces the expansion of stack 40 due to the pressure differential between the interior of stack 40 and chamber 48. The pressure differential normally used for superplastic forming of Ti-6A1-4V is normally in a range of from 25 to 250 psi. Metal blank 14 is initially lifted by the pressure differential and pulls with it at the selected joined areas metal blank 12. Such expansion allows the pressurized inert gas to flow through apertures 96 to provide an equal pressure within stack 40 so that the core (workpiece 12) is formed uniformly. The equal pressure also retains metal blank 10 of stack 40 in its initial position, it being forced against the base or lower tooling frame 46.

Figure 5:
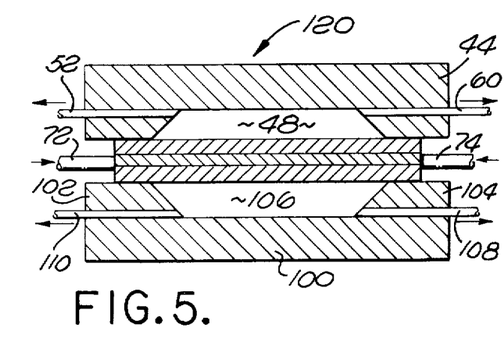
FIGS. 5 and 6 are cross-sectional elevational views of a modified forming apparatus with a three-piece metal sheet assembly inserted therein in its initial position in FIG. 5 and in its final expanded position in FIG. 6.
Figure 6:
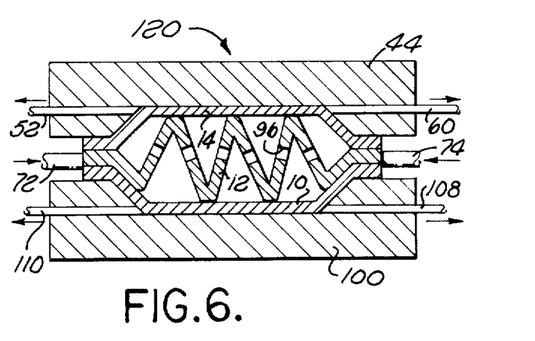

FIGS. 5 and 6 illustrate the use of a differently configured lower tooling frame 100 having preferably integral sidewalls 102, 104 which define a chamber 106. Tube lines 108 and 110 are provided in lower tooling frame 100 for creating an inert gas environment in chamber 106 and to act as vents or vacuum lines when superplastically expanding stack 40. If stack 40 is diffusion bonded in forming apparatus 120, the pressure in both chambers 48 and 106 would have to be increased, preferably equally, so that a suitable pressure is applied to stack 40 for diffusion bonding. For superplastically expanding stack 40, the pressure within stack 40 would be increased by allowing flow of inert pressurized gas into stack 40 through lines 72 and 74 so that the pressure within stack 40 is greater than that in chambers 48 and 106. Additionally, the pressure in chambers 48 and 106 would have been reduced and optimally exposed to vacuum through lines 108, 110, 52, and 60. As shown in FIG. 6, since all three of the metal blanks of stack 40 would be superplastically expanded, each of the blanks must be of a material with an effective strain rate sensitivity for superplastic forming. As illustrated, metal blank 14 is forced upwards into chamber 48, metal blank 10 is forced downward into chamber 106, and metal blank 12, by virtue of being selectively joined at specified locations to both metal blank 10 and metal blank 14 is deformed in both directions and forms the core of the sandwich structure as shown.

Figure 7:
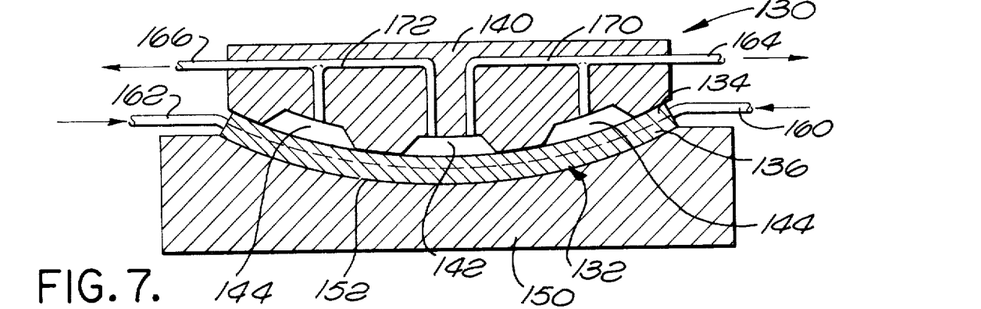
FIGS. 7 and 8 are cross-sectional elevational views of a modified forming apparatus with a two-piece metal sheet assembly inserted therein in its initial position in FIG. 7 and in its final expanded position in FIG. 8.
Figure 8:
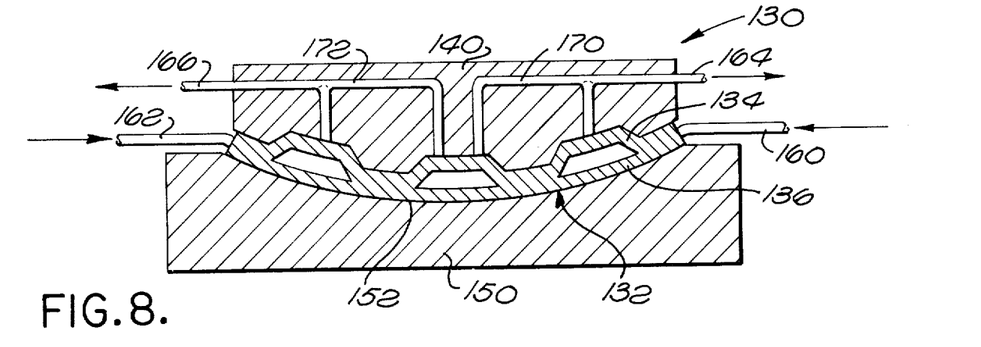

FIGS. 7 and 8 illustrate a modified forming apparatus 130 and the use of a different technique for selective joining. The use of a two sheet stack 132 with metal blanks 134 and 136 is also illustrated. Stack 132 could be joined as by diffusion bonding, brazing, or spot welding prior to insertion in forming apparatus 130. If diffusion bonded, the metal blanks 134 and 136 would first be selectively treated with a suitable stop-off so that only certain predetermined areas of the stack would be joined. Optimally, however, the stack 132 would be unjoined prior to insertion in the forming apparatus 130. When such is the case, stop-off need not be applied.

Forming apparatus 130 utilizes an upper tooling frame 140 having a lower arcuate surface defined by a plurality of protuberances 142 spaced from each other by intermediate recesses or chambers 144. Lower tooling frame 150 has a complimentary upper arcuate surface 152 to that defined by protuberances 142. Inflation tubes 160 and 162 are positioned between the two metal blanks 134 and 136. Similar to recesses 76 and 77 in metal blank 10 (FIG. 1) blanks 134 and 136 are provided with aligned recesses (not shown) which define a cylindrical chamber (not shown) in which tubes 160 and 162 are located. Lines 164 and 166, like lines 52 and 60 of FIG. 2, provide an inert gas environment in chambers 144 and act as vents or connection to sources of vacuum for drawing out the inert gas from chambers 144 for superplastically expanding metal blank 134 within those chambers. Each of tubes 164 and 166 would be provided with a valve (not shown) and pressure gauge (not shown) to control addition and removal of inert gas in chambers 144. Tubes 164 and 166 are connected to bores 170 and 172 respectively which provide access to chambers 144.

Depending on the thickness and desired curvature of stack 132, the stack can be preformed to this shape prior to insertion in forming apparatus 130 by conventional sheet metal forming, as roll forming or superplastic forming, or subsequent to insertion in forming apparatus 130 by pressure applied to stack 132 by the protuberances 142 of upper tooling frame 140 and surface 152 of lower tooling frame 150. Preforming in the forming apparatus 130 is preferable as the preforming and selective diffusion bonding are accomplished simultaneously when the stack is also unjoined prior to insertion in forming apparatus 130, thereby saving fabrication time and equipment costs.

Using this forming apparatus 130, the unjoined stack can be diffusion bonded by application of pressure from upper tooling frame 140 and lower tooling frame 150 at required temperature for a suitable time duration. By virtue of protuberances 142, the pressure is only applied to selected areas of stack 132 so that only those areas are diffusion bonded, thereby allowing for expansion in the unbonded areas.

After diffusion bonding (or insertion into forming apparatus 130 if the stack 132 has already been joined) and preforming, stack 132 is inflated by flow of inert gas through lines 160 and 162 so that the unjoined areas of metal blank 134 are expanded into chambers 144. Optimally a vacuum would be applied to chambers 144 through lines 164 and 166. As the only space provided for expansion is chambers 144, only metal blank 134 is expanded and consequently only that blank must be of a material suitable for superplastic forming. It is seen from the above that diffusion bonding, pre-forming, and superplastic expansion can all be done in the same apparatus in one operation.

It should be noted that the superplastic expansion could be done prior to diffusion bonding of stack 132 by sealing the surrounding area around stack 132 without applying pressure to stack 132. Thus, upper tooling frame 140 could be applied to stack 132 contacting at its protuberances 142 without sufficient pressure for diffusion bonding. With this procedure, stack 132 would be expanded into chambers 144 by superplastic inflation with protuberances 142 preventing expansion at other areas without application of pressure by virtue of the position of tooling frame 140. After such expansion, sufficient pressure would be applied by tooling frames 140 and 150 at areas corresponding to the lower surface of protuberances 142 to diffusion bond those corresponding areas of stack 132.

Figure 9:
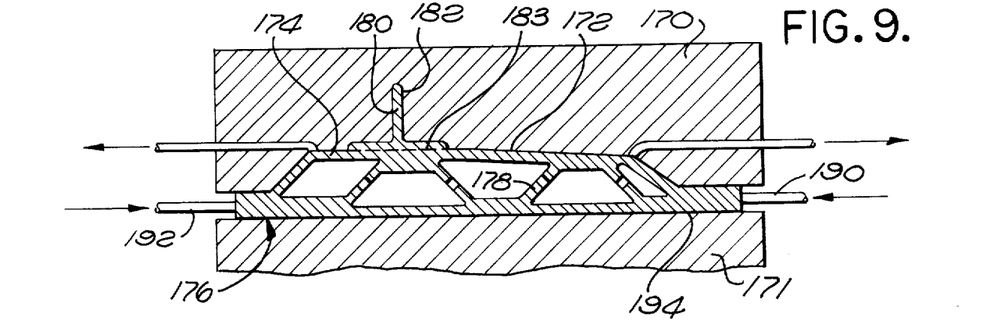
FIG. 9 is a cross-sectional elevational view of a modified forming apparatus illustrating a tapered three-piece metal sheet assembly in final formed position with an attachment joined to the sandwich structure at the broken lines.

FIG. 9 illustrates the forming of a variably shaped structure, here shown as a tapered sandwich structure with an attachment joined thereto. Applicant accomplishes tapering of the sandwich structure by suitably designing the corresponding shaping surface of the upper tooling frame. In FIG. 9, upper tooling frame 170 has an upper shaping surface 172 which angles downwardly from one side to the other (shown as left to right). Thus, when the upper metal blank 174 of stack 176 is superplastically expanded against surface 172, it is shaped into the taper of such surface. The core formed by blank member 178 of stack 176 is also tapered by virtue of its dependence upon the movement of upper blank 174.

Attachment 180, shown in an arbitrary design, is joined to the stack 176 on the upper member 174 along bond line 183 during the superplastic expansion of stack 176 in the same forming apparatus, thereby lowering fabrication time, apparatus cost, and forming difficulty. As set out in our prior co-pending application, Ser. No. 511,900, attachment 180 could be positioned within a suitably shaped groove, here shown at 182, where the attachment may or may not protrude from such groove, or be located in the forming chamber, without the use of a groove so that it forms either a male or female shaping surface itself. For purposes of the claims, when a groove is used, it is considered part of the forming chamber, so that the attachment is positioned within the chamber when in the groove. In the embodiment illustrated, when stack 176 is superplastically expanded, it contacts attachment 180 along bond line 182. By virtue of the superplastic forming temperature, which attachment 180 is also heated to, and the pressure expanding stack 176 which eventually forces upper member 174 to bear against surface 172 and attachment 182, attachment 182 is diffusion bonded to stack 176 along bond line 182 when the temperature and pressure are maintained at a required diffusion bonding level for a suitable time duration. Optimally, the temperature and pressure for superplastic forming of members 174 and 178 would also be suitable for diffusion bonding so that the pressure or temperature would not have to be increased or decreased after forming in order to diffusion bond. The material selected for attachment 182 should be one that is suitable for diffusion bonding to the material of member 174, preferably a like material. As the superplastic forming gas pressure typically used is 150 psi, a pressure considerably less than the 2000 psi used normally in diffusion bonding, the bond which results may not develop full parent metal strength, but would likely be analogous to a high quality braze joint. However, once the sandwich structure is fully expanded, as shown in FIG. 9, the pressure can be increased within the expanded sandwich through inflation tubes 192 and 192 to a level more suitable for complete diffusion bonding.

Figure 10:
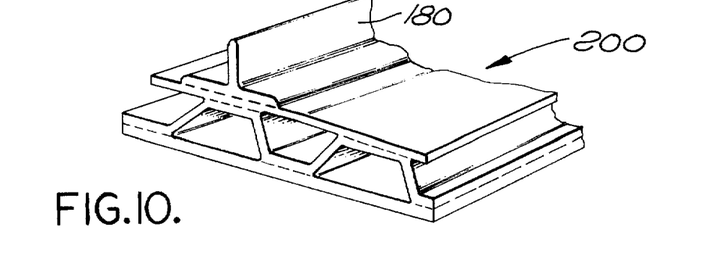
FIG. 10 is a perspective view with the ends cut off of the formed sandwich structure of FIG. 9.

A close-out such as shown at 194 can also be formed to the expanded sandwich structure in the same operation by diffusion bonding the close out 194, which comprises an unexpanded end of stack 176, by heating stack 176 to the diffusion bonding temperature with application of pressure by upper and lower tooling frames 170 and 171 respectively. The expanded sandwich structure 200 of FIG. 9 removed from the forming apparatus is shown at FIG. 10 with the side ends cut off.

Figure 11:
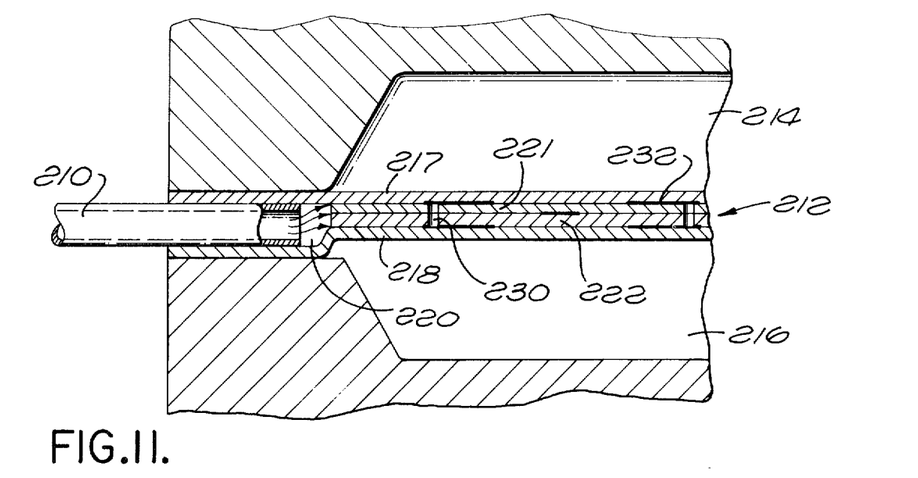
FIG. 11 is a fragmentary cross-sectional elevational view of a modified forming apparatus illustrating the positioning of an inflation tube relative to a four-piece metal sheet assembly.
Figure 12:
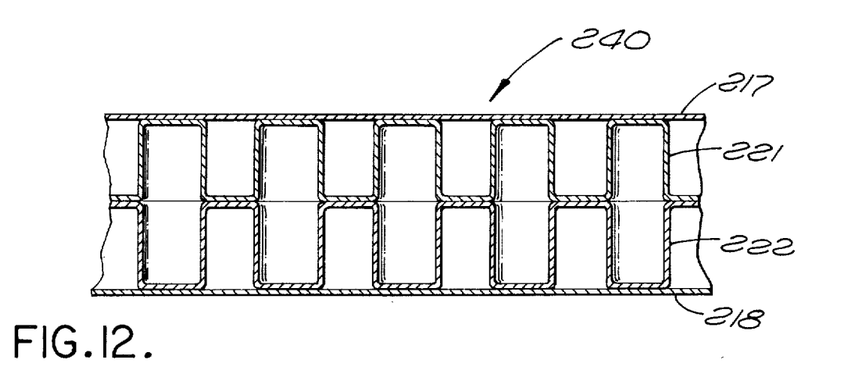
FIG. 12 is a cross-sectional elevational view of a sandwich structure formed from a four-piece metal sheet assembly.
Figure 13:
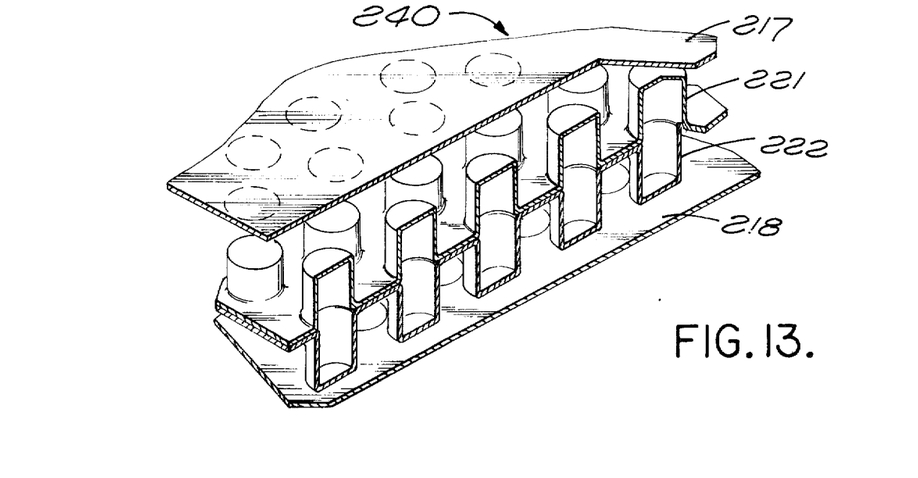
FIG. 13 is a fragmentary perspective view of the sandwich structure shown in FIG. 12.

FIG. 11 illustrates the positioning of an inflation tube 10 relative to a four-piece metal sheet assembly or stack 212 in a forming apparatus having upper and lower chambers 214 and 216 respectively. Inflation tube 210 is positioned between the upper metal blank 217 and lower metal blank 218 with the lower metal blank 218 having a recess 220 at its periphery such as recess 76 shown in FIG. 1. Inner metal blanks 221 and 222 of stack 212 have a recess such as that shown at 78 in FIG. 1 which allows for positioning of inflation tube 210 between members 217 and 218. Apertures 230, for transmitting inflating gas, and stop-off 232 at areas for which no bonding is desired, are also illustrated. Illustrative views of the final formed sandwich structure 240 of FIG. 11 are shown at FIGS. 12 and 13.

Thus it is apparent that there has been provided, in accordance with the invention, a method for making metallic sandwich structures from a plurality of workpieces that fully satisfies the objectives, aims, and advantages set forth above. While the invention has been described in conjunction with specific embodiments thereof, it is evident that many alternatives, modifications, and variations, will be apparent to those skilled in the art in light of the foregoing description. Accordingly, it is intended to embrace all such alternatives, modifications, and variations which fall within the spirit and scope of the appended claims.

We claim:

1. A method of making a metallic sandwich structure from a plurality of workpieces comprising:
   providing at least two shaping members;
   providing a plurality of metal blank workpieces, each of said workpieces having two opposed principal surfaces, at least one of said workpieces having an effective strain rate sensitivity;
   treating said workpieces at selected areas to prevent bonding at those areas;
   positioning said workpieces in a stack, contacting at their principal surfaces, at least one of the outer workpieces of said stack having an effective strain rate sensitivity;
   enclosing at least one chamber by positioning said stack of workpieces relative to said shaping members;
   heating said workpieces to a temperature within a temperature range sufficient to produce diffusion bonding of said workpieces at preselected areas under coordinated temperature-pressure-time duration conditions;
   applying compressive pressure sufficient for diffusion bonding to said stack of workpieces;
   maintaining said pressure and said temperature within said temperature range for a time duration sufficient to produce diffusion bonding of said workpieces at said preselected areas; and
   inducing tensile stress in said at least one outer workpiece causing at least a portion of said at least one outer workpiece to expand superplastically into said at least one chamber and to form against, and into intimate contact with, at least one of said shaping members.

2. The method of claim 1 wherein said temperature sufficient to produce diffusion bonding is suitable for superplastic forming.

3. The method as set out in claim 2 also including after the step of enclosing at least one chamber, the step of providing an inert gas environment in said at least one chamber.

4. The method as set out in claim 3 wherein first and second chambers are enclosed by positioning said stack of workpieces and wherein tensile stress is induced in both outer workpieces of said stack causing at least a portion of one outer workpiece to expand superplastically into said first chamber and at least a portion of the other outer workpiece to expand superplastically into said second chamber.

5. The method as set out in claim 3 wherein said tensile stress is induced by applying an inert gas fluid pressure loading across the principal surfaces of said at least one outer workpiece for a substantial period of time inversely related to the induced tensile stress and said at least one outer workpiece is stretched substantially in excess of its original surface area.

6. The method as set out in claim 5 wherein said treating is accomplished by the application of a suitable stop-off material, and wherein said compressive pressure is applied by fluid pressure within said at least one chamber.

7. The method as set out in claim 5 wherein said fluid pressure loading is applied by distributing equal inert gas pressure between the workpiece of said stack.

8. The method as defined in claim 7 wherein said fluid pressure loading comprises a greater pressure of inert gas between the workpieces of said stack relative to that within said at least one chamber and wherein said at least one chamber is vented to allow for efflux of inert gas as said at least one outer workpiece expands and thereby reduces the size of said at least one chamber.

9. The method as defined in claim 7 wherein said fluid pressure loading comprises application of vacuum to said at least one chamber while maintaining a positive pressure of inert gas between the workpieces of said stack.

10. The method as defined in claim 5 also including the step of providing at least one metal attachment to be diffusion bonded to said at least one outer workpiece, and wherein said at least one attachment is located within said at least one chamber, and said at least one outer workpiece also deforms against and diffusion bonds to said at least one attachment.

11. The method as defined in claim 5 wherein said inert gas is argon, said metal workpieces are titanium alloy sheet, said temperature is maintained within a range of about 1650°–1750°F, and said compressive pressure is maintained within a range of about 150–600 psi.

12. The method of claim 1 also including after the step of maintaining said pressure and temperature and the step of adjusting the temperature to a value suitable for superplastic forming.

13. A method of making a metallic sandwich structure from a plurality of workpieces comprising:
providing at least two shaping members;
providing a plurality of metal workpieces, each of said workpieces having two opposed principal surfaces, at least one of said workpieces having an effective strain rate sensitivity;
positioning said workpieces in a stack contacting at their principal surfaces, at least one of the outer workpieces of said stack having an effective strain rate sensitivity;
enclosing at least one chamber by positioning said stack of workpieces relative to said shaping members;
heating said workpices to a temperature within a temperature range sufficient to produce diffusion bonding of said workpeices at preselected areas under coordinated temperature-pressure-time duration conditions;
applying compressive pressure to selected areas of said stack sufficient for diffusion bonding of said preselected areas;
maintaining said pressure and said temperature within said temperature range for a time duration sufficient to produce diffusion bonding of said workpieces at said preselected areas; and
inducing tensile stress in said at least one outer workpiece causing at least a portion of said at least one outer workpiece to expand superplastically into said at least one chamber and to form against, and into intimate contact with at least one of said shaping members.

14. The method of claim 13 wherein said temperature sufficient to produce diffusion bonding is suitable for superplastic forming.

15. The method as set out in claim 14 also including after the step of enclosing at least one chamber, the step of providing an inert gas environment in said at least one chamber.

16. The method as set out in claim 15 wherein said compressive pressures preforms said stack of workpieces.

17. The method as set out in claim 15 wherein said tensile stress is induced by applying an inert gas fluid pressure loading across the principal surfaces of said at least one outer workpiece for a substantial period of time inversely related to the induced tensile stress, and said at least one outer workpiece is stretched substantially in excess of its original surface area.

18. The method as set out in claim 17 wherein said one of said shaping members has at least one protruding portion and said compressive pressure is applied to selected areas of said stack by said at least one protruding portion.

19. The method as set out in claim 17 wherein said fluid pressure loading is applied by distributing equal inert gas pressure between the workpieces of said stack.

20. The method as defined in claim 10 wherein said fluid pressure loading comprises a greater pressure of inert gas between the workpieces of said stack relative to that within said at least one chamber and wherein said at least one chamber is vented to allow for efflux of inert gas as said at least one outer workpiece expands and thereby reduces the size of said at least one chamber.

21. The method as defined in claim 19 wherein said fluid pressure loading comprises application of vacuum to said at least one chamber while maintaining a positive pressure of inert gas between the workpieces of said stack.

22. The method as defined in claim 17 wherein said inert gas is argon, said metal workpieces are titanium alloy sheet, said temperature is maintained within a range of about 1650°–1750°F.

23. The method defined in claim 17 also including the step of providing at least one metal attachment to be diffusion bonded to said at least one outer workpiece, and wherein said at least one attachment is located within said at least one chamber, and said at least one outer workpiece also deforms against and diffusion bonds to said at least one attachment.

24. The method of claim 13 also including after the step of maintaining said pressure and temperature the step of adjusting the temperature to a value suitable for superplastic forming.

25. A method of making a metallic sandwich structure from a plurality of workpieces comprising:
providing a plurality of metal blank workpieces, each of said workpieces having two opposed principal surfaces, at least one of said workpieces having an effective strain rate sensitivity;
positioning said workpieces in a stack contacting at their principal surfaces, at least one of the outer workpieces of said stack having an effective strain rate sensitivity;
joining preselected areas of said stack of workpieces;
providing at least two shaping members;
enclosing at least one chamber by positioning said stack of workpieces relative to said shaping members;
heating said at least one outer workpiece to a temperature suitable for superplastic forming, and
inducing tensile stress in said at least one outer workpiece causing at least a portion of said at least one outer workpiece to expand superplastically into said at least one chamber and to form against, and into intimate contact with, at least one of said shaping members.

26. The method as set out in claim 25 also including after the step of providing a plurality of metal workpieces, the step of treating said workpieces at selected areas to prevent bonding at those areas.

27. The method as set out in claim 26 also including after the step of enclosing at least one chamber, the step of providing an inert gas environment in said chamber.

28. The method as set out in claim 27 also including the step of preforming said stack of workpieces.

29. The method as set out in claim 27 wherein first and second chambers are enclosed by positioning said stack of workpieces and wherein tensile stress is induced in both outer workpieces of said stack causing at least a portion of one outer workpiece to expand superplastically into said first chamber and at least a portion of the other outer workpiece to expand superplastically into said second chamber.

30. The method as set out in claim 27 wherein said tensile stress is induced by applying an inert gas fluid pressure loading across the principal surfaces of said at least one outer workpiece for a substantial period of time inversely related to the induced tensile stress, and said at least one outer workpiece is stretched substantially in excess of its original surface area.

31. The method as set out in claim 30 wherein said treating is accomplsihed by the application of a suitable stop-off material.

32. The method as set out in claim 30 wherein said fluid pressure loading is applied by distributing equal inert gas pressure between the workpieces of said stack.

33. The method as defined in claim 32 wherein said fluid pressure loading comprises a greater pressure of inert gas between the workpieces of said stack relative to that within said at least one chamber and wherein said at least one chamber is vented to allow for efflux of inert gas as said at least one outer workpiece expands and thereby reduces the size of said at least one chamber.

34. The method as defined in claim 32 wherein said fluid pressure loading comprises application of vacuum to said at least one chamber while maintaining a positive pressure of inert gas between the workpieces of said stack.

35. The method as defined in claim 30 also including the step of providing at least one metal attachment to be diffusion bonded to said at least one outer workpeice, and weehrein said at least one attachment is located within said at least one chamber, and said at least one outer workpiece also deforms against and diffusion bonds to said at least one attachment.

36. The method as defined in claim 30 wherein said inert gas is argon, said metal workpieces are titanium alloy sheet, and said temperature is within a range of about 1650°–1750°F.

37. The method as set out in claim 25 wherein said joining is accomplished by diffusion bonding.

38. A method of making a metallic sandwich structure from a plurality of workpieces comprising:
providing at least two shaping members;
providing a plurality of metal blank workpieces, each of said workpieces having two opposed principal surfaces, at least one of said workpieces having an effective strain rate sensitivity;
positioning said workpieces in a stack, contacting a their principal surfaces, at least one of the outer workpieces of said stack having an effective strain rate sensitivity;
enclosing at least one chamber by positioning said stack of workpieces relative to said shaping members;
heating said workpieces to a temperature suitable for superplastic forming;
inducing tensile stress in at least one of the outer workpieces having an effective strain rate sensitivity causing at least a portion of said at least one outer workpiece to expand superplastically into said at least one chamber and to form against, and into intimate contact with, at least one of said shaping members; and
diffusion bonding selected areas of said stack of workpieces under coordinated temperature-pressure-time duration conditions.

* * * * *

UNITED STATES PATENT OFFICE
CERTIFICATE OF CORRECTION

Patent No. 3,927,817　　　　　　　　　Dated December 23, 1975

Inventor(s) C. Howard Hamilton; Leonard A. Ascani, Jr.

It is certified that error appears in the above-identified patent and that said Letters Patent are hereby corrected as shown below:

IN THE ABSTRACT:

Line 5, after "ous techniques" delete "are and insert -- for --.

Column 8, line 35, delete "superlastic" and insert--superplastic--.

Column 11, lines 62-63, delete "workpeices" and substitute--workpieces--.

IN THE CLAIMS:

Claim 13, line 46, delete "workpices" and insert--workpieces--;

line 48, delete "workpeices" and insert--workpieces--.

Claim 20, line 22, after "defined in claim" delete "10" and insert--19--.

Claim 35, line 9, delete "weehrein" and insert -- wherein--

Signed and Sealed this

First Day of March 1977

[SEAL]

Attest:

RUTH C. MASON  
*Attesting Officer*

C. MARSHALL DANN  
*Commissioner of Patents and Trademarks*